US011209942B2

(12) United States Patent
Yeh et al.

(10) Patent No.: US 11,209,942 B2
(45) Date of Patent: Dec. 28, 2021

(54) METHOD FOR MANUFACTURING CAPACITIVE TOUCH CONTROL PANEL HAVING A PLURALITY OF BRIDGING STRUCTURES

(71) Applicant: HIGGSTEC INC., Taoyuan (TW)

(72) Inventors: Chun-Wei Yeh, Taipei (TW); Sheng-Liang Lin, Yilan County (TW); Yi-Han Wang, New Taipei (TW); Hung-Yu Tsai, Yilan County (TW)

(73) Assignee: HIGGSTEC INC., Taoyuan (TW)

( * ) Notice: Subject to any disclaimer, the term of this patent is extended or adjusted under 35 U.S.C. 154(b) by 0 days.

(21) Appl. No.: 16/513,992

(22) Filed: Jul. 17, 2019

(65) Prior Publication Data

US 2021/0019002 A1 Jan. 21, 2021

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ... H01L 2924/00014; H01L 2224/0345; H01L 2224/03462; H01L 2224/05572; H01L 2224/11849; H01L 2224/131; H01L 2924/351; H01L 2924/00; H01L 2924/00012; H01L 2924/014; H01L 29/0673; H01L 29/165; H01L 29/401; H01L 29/42376; H01L 29/66439; H01L 29/66636; H01L 29/775; H01L 29/7848; H01L 29/78696; H01L 2224/02351; H01L 2224/02375; H01L 2224/0391; H01L 2224/0401; H01L 2224/05008; H01L 2224/05009; H01L 2224/05022; H01L 2224/05027; H01L 2224/05569; H01L 2224/1134; H01L 2224/13006;
(Continued)

(56) References Cited

U.S. PATENT DOCUMENTS

| 2011/0134070 A1* | 6/2011 | Wang | G06F 3/0443 345/174 |
| 2013/0277197 A1* | 10/2013 | Mi | G06F 3/0445 200/600 |
| 2015/0268776 A1* | 9/2015 | Ishizaki | G06F 1/16 345/174 |

OTHER PUBLICATIONS

Seokwoo Son, et al., "Laser-assisted fabrication of single-layer flexible touch sensor", Scientific Reports, Oct. 5, 2016, www.nature.com/scientificreports.

(Continued)

*Primary Examiner* — Ram A Mistry
(74) *Attorney, Agent, or Firm* — Li & Cai Intellectual Property (USA) Office

(57) ABSTRACT

A method for manufacturing capacitive touch control panel and a capacitive touch control panel are provided. The method includes forming a sensing circuit on a substrate and then forming a communicating structure on the substrate. The communicating structure is conductive, and is disposed to be near at least two adjacent side walls of the substrate. A gap is formed between the communicating structure and the plurality of the sensing electrodes that are near the communicating structure. The next step is to form a plurality of bridging structures for connecting the plurality of the sensing electrodes and the communicating structure. The last step is to remove a portion of the communicating structure by laser cutting to form a plurality of output cables.

11 Claims, 17 Drawing Sheets

(58) Field of Classification Search
CPC ....... H01L 2224/13026; H01L 23/3114; H01L 23/3192; H01L 23/525; H01L 23/562; H01L 24/03; H01L 24/05; H01L 24/13; H01L 21/02008; H01L 21/823807; H01L 21/823814; H01L 25/04; H01L 25/043; H01L 25/0657; H01L 27/0617; H01L 27/092; H01L 29/0847; H01L 29/1054; H01L 29/42392; H01L 29/66; H01L 29/7853; H01L 21/02636; H01L 21/30604; H01L 21/76224; H01L 21/823412; H01L 27/088; H01L 29/0692; H01L 29/41733; H01L 29/41775; H01L 29/42316; H01L 29/42384; H01L 29/7845; H01L 28/10; B82Y 10/00; B82Y 99/00; G06F 3/0412; G06F 2203/04103; G06F 2203/04111; G06F 3/0445; G06F 3/0446; G06F 3/0416; G06F 3/044; G06F 1/181; G06F 1/184; G06F 1/187; G06F 1/20; G06F 2203/04106; G06F 3/045; G06F 3/0488; H03K 17/962; H03K 2217/960755; G02F 1/133305; G02F 1/13338; G02F 1/133502; G02F 1/133528; G02F 1/13363; G02F 1/13439; G02F 2001/133531; G02F 2001/133541; G02F 2001/133635; G02F 2001/133638; G09G 5/006; H01F 2027/2809; H01F 27/2804

See application file for complete search history.

(56) References Cited

OTHER PUBLICATIONS

Seokwoo Son, et al.,"Supplementary information Laser-assisted fabrication of single-layer flexible touch sensor", www.nature.com/scientificreports.

Ulf Quentin, et al., "Micro-processing in the ultraviolet: UV laser applications in manufacturing consumer electronics Conference Presentation)", Mar. 13, 2019.

* cited by examiner

| Forming a sensing circuit on a substrate, wherein the sensing circuit includes a plurality of sensing electrodes that are disposed in a multi-column arrangement | ~S10 |

| Forming a communicating structure on the substrate, wherein the communicating structure is conductive, the communicating structure is disposed to be near at least two adjacent side walls of the substrate, and a gap is formed between the communicating structure and the plurality of the sensing electrodes that are near the communicating structure | ~S11 |

| Forming a plurality of bridging structures, wherein each of the plurality of bridging structures has one end that is connected to the plurality of the sensing electrodes and the other end that is connected to the communicating structure, and the bridging structures are conductive | ~S12 |

| Removing a portion of the communicating structure by laser cutting to form a plurality of output cables, wherein each of the plurality of output cables has one end that is connected to one of the sensing electrodes through the bridging structure, and each of the output cables is not connected to one another | ~S13 |

FIG. 2

Forming a sensing circuit and a communicating structure on a substrate, wherein the sensing circuit includes a plurality of sensing electrodes that are disposed in a multi-column arrangement, wherein the communicating structure is in a ring shaped form, wherein the sensing circuit is correspondingly disposed within an area that is surrounded by the communicating structure ~S20

Forming a plurality of bridging structures, wherein each of the plurality of bridging structures has one end that is connected to the plurality of the sensing electrodes and the other end that is connected to the communicating structure ~S21

Removing a portion of the communicating structure by laser cutting to form a plurality of output cables, wherein each of the plurality of output cables has one end that is connected to one of the sensing electrodes through the bridging structure ~S22

FIG. 9

Forming a sensing circuit and a communicating structure on a substrate, wherein the sensing circuit includes a plurality of sensing electrodes that are disposed in a multi-column arrangement, wherein the communicating structure is in a ring shaped form, and wherein the sensing circuit is correspondingly disposed within an area that is surrounded by the communicating structure, and the communicating structure is connected to the sensing electrodes near the communicating structure ~S30

Removing a portion of the communicating structure by laser cutting to form a plurality of output cables. Each of the plurality of output cables has one end that is connected to one of the sensing electrodes ~S31

FIG. 15

METHOD FOR MANUFACTURING CAPACITIVE TOUCH CONTROL PANEL HAVING A PLURALITY OF BRIDGING STRUCTURES

FIELD OF THE DISCLOSURE

The present disclosure relates to a method for manufacturing touch control panel and a touch control panel, and more particularly to a method for manufacturing a capacitive touch control panel and a capacitive touch control panel.

BACKGROUND OF THE DISCLOSURE

FIG. 1 shows a conventional capacitive touch control panel P. A manufacturer has to dispose an output cable module PX (including a flexible printed circuit for connecting an output cable of the touch control panel P) on different sides P1, P2, P3, P4 of the touch control panel P based on requirements of the different clients. Even if different clients request that the output cable module PX be disposed on the same side of the touch control panel P, they may request that the output cable module PX be arranged at different positions on that side. For example, while both of two clients may request that the output cable module PX be disposed on the same side P1 of the touch control panel P, one of the clients may demand that the output cable module PX be arranged near the side P2, while the other of the clients may demand that the output cable module PX be arranged near the side P3.

As a result, based on a conventional manufacturing process, a corresponding mask needs to be redesigned whenever the position of the output cable module PX is changed, thereby significantly increasing manufacturing costs associated therewith.

SUMMARY OF THE DISCLOSURE

In response to the above-referenced technical inadequacies, the present disclosure provides a method for manufacturing a capacitive touch control panel and a capacitive touch control panel.

In one aspect, the present disclosure provides a method for manufacturing a capacitive touch control panel. The method for manufacturing capacitive touch control panel includes forming a sensing circuit on a substrate, forming a communicating structure on the substrate, forming a plurality of bridging structures, and removing a portion of the communicating structure by laser cutting to form a plurality of output cables. The sensing circuit includes a plurality of sensing electrodes that are disposed in a multi-column arrangement. The communicating structure is conductive. The communicating structure is disposed to be near at least two adjacent side walls of the substrate. A gap is formed between the communicating structure and the plurality of the sensing electrodes that are near the communicating structure. Each of the plurality of bridging structures has one end that is connected to the plurality of the sensing electrodes and the other end that is connected to the communicating structure. The bridging structures are conductive. Each of the plurality of output cables has one end that is connected to one of the sensing electrodes through the bridging structure. Each of the output cables is not connected to one another. The output cable is connected to a control device. Each of the sensing electrodes is operable to generate corresponding signals that are transmitted to the control device via the output cable.

In certain embodiments, the present disclosure provides a method for manufacturing capacitive touch control panel. In the step of forming the output cables, at least one shielding structure is further formed when the portion of the communicating structure is removed by the laser cutting. The shielding structure is not connected to any one of the output cables or any one of the sensing electrodes.

In one aspect, the present disclosure provides a method for manufacturing capacitive touch control panel, including: forming a sensing circuit and a communicating structure on a substrate, wherein the sensing circuit includes a plurality of sensing electrodes that are disposed in a multi-column arrangement, wherein the communicating structure is in a ring shaped form, wherein the sensing circuit is correspondingly disposed within an area that is surrounded by the communicating structure, wherein a gap is formed between the communicating structure and the plurality of the sensing electrodes that are near the communicating structure, and wherein the communicating structure is conductive; forming a plurality of bridging structures, wherein each of the plurality of bridging structures has one end that is connected to the plurality of the sensing electrodes and the other end that is connected to the communicating structure, and the bridging structures are conductive; and removing a portion of the communicating structure by laser cutting to form a plurality of output cables, wherein each of the plurality of output cables has one end that is connected to one of the sensing electrodes through the bridging structure, and each of the output cables is not connected to one another. The output cable is connected to a control device. Each of the sensing electrodes is operable to generate corresponding signals that are transmitted to the control device via the output cable.

In certain embodiments, the present disclosure provides a method for manufacturing capacitive touch control panel. In the step of forming the output cables, at least one shielding structure is further formed when the portion of the communicating structure is removed by the laser cutting, and the shielding structure is not connected to any one of the output cables or any one of the sensing electrodes.

In one aspect, the present disclosure provides a method for manufacturing capacitive touch control panel, including: forming a sensing circuit and a communicating structure on a substrate, wherein the sensing circuit includes a plurality of sensing electrodes that are disposed in a multi-column arrangement, wherein the communicating structure is in a ring shaped form, wherein the sensing circuit is correspondingly disposed within an area that is surrounded by the communicating structure, wherein a gap is formed between the communicating structure and the plurality of the sensing electrodes that are near the communicating structure, and wherein the communicating structure is conductive; removing a portion of the communicating structure by laser cutting to form a plurality of output cables, wherein each of the plurality of output cables has one end that is connected to one of the sensing electrodes, and each of the output cables is not connected to one another. The output cable is connected to a control device. Each of the sensing electrodes is operable to generate corresponding signals that are transmitted to the control device via the output cable.

In certain embodiments, the present disclosure provides a method for manufacturing capacitive touch control panel. In the step of forming the output cables, at least one shielding structure is further formed when the portion of the communicating structure is removed by the laser cutting, and the shielding structure is not connected to any one of the output cables or any one of the sensing electrodes.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 2 is a flow chart of a method for manufacturing a capacitive touch control panel according to a first embodiment of the present disclosure.

FIG. 9 is a flow chart of the method for manufacturing the capacitive touch control panel according to a third embodiment of the present disclosure.

FIG. 15 is a flow chart of the method for manufacturing the capacitive touch control panel according to a fourth embodiment of the present disclosure.

DETAILED DESCRIPTION OF THE EXEMPLARY EMBODIMENTS

Figure 1:
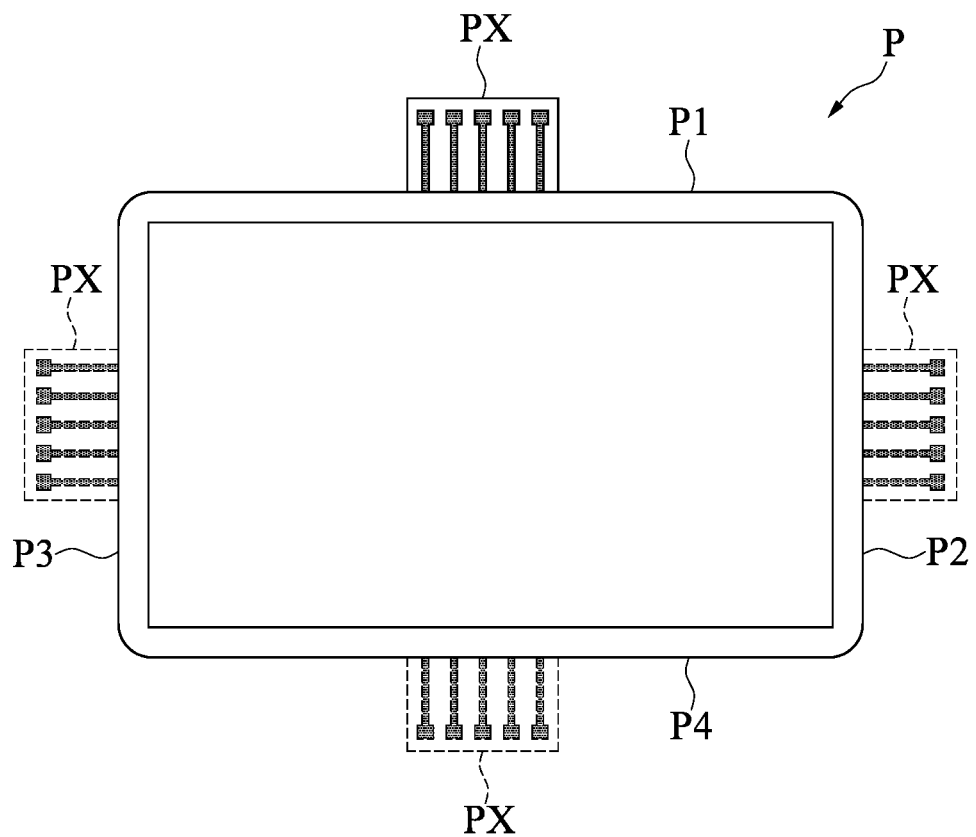
FIG. 1 is a schematic view of a conventional capacitive touch control panel.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 2, a method for manufacturing a capacitive touch control panel includes the following steps.

Step S10: forming a sensing circuit 20 on a substrate 10. The sensing circuit 20 includes a plurality of sensing electrodes 211, 221 that are disposed in a multi-column arrangement.

Step S11: forming a communicating structure 30 on the substrate 10. The communicating structure 30 is conductive. The communicating structure 30 is disposed to be near at least two adjacent side walls of the substrate 10. A gap R is formed between the communicating structure 30 and the plurality of the sensing electrodes 211, 221 that are near the communicating structure 30.

Step S12: forming a plurality of bridging structures 40. Each of the plurality of bridging structures 40 has one end that is connected to the plurality of the sensing electrodes 211, 221 and the other end that is connected to the communicating structure 30. The bridging structures 40 are conductive.

Step S12: removing a portion of the communicating structure 30 by laser cutting to form a plurality of output cables 31. Each of the plurality of output cables 31 has one end that is connected to one of the sensing electrodes 211, 221 through the bridging structure 40. Each of the output cables 31 is not connected to one another.

The output cable 31 is connected to a control device. Each of the sensing electrodes 211, 221 is operable to generate corresponding signals that are transmitted to the control device via the output cable 31.

Figure 3:
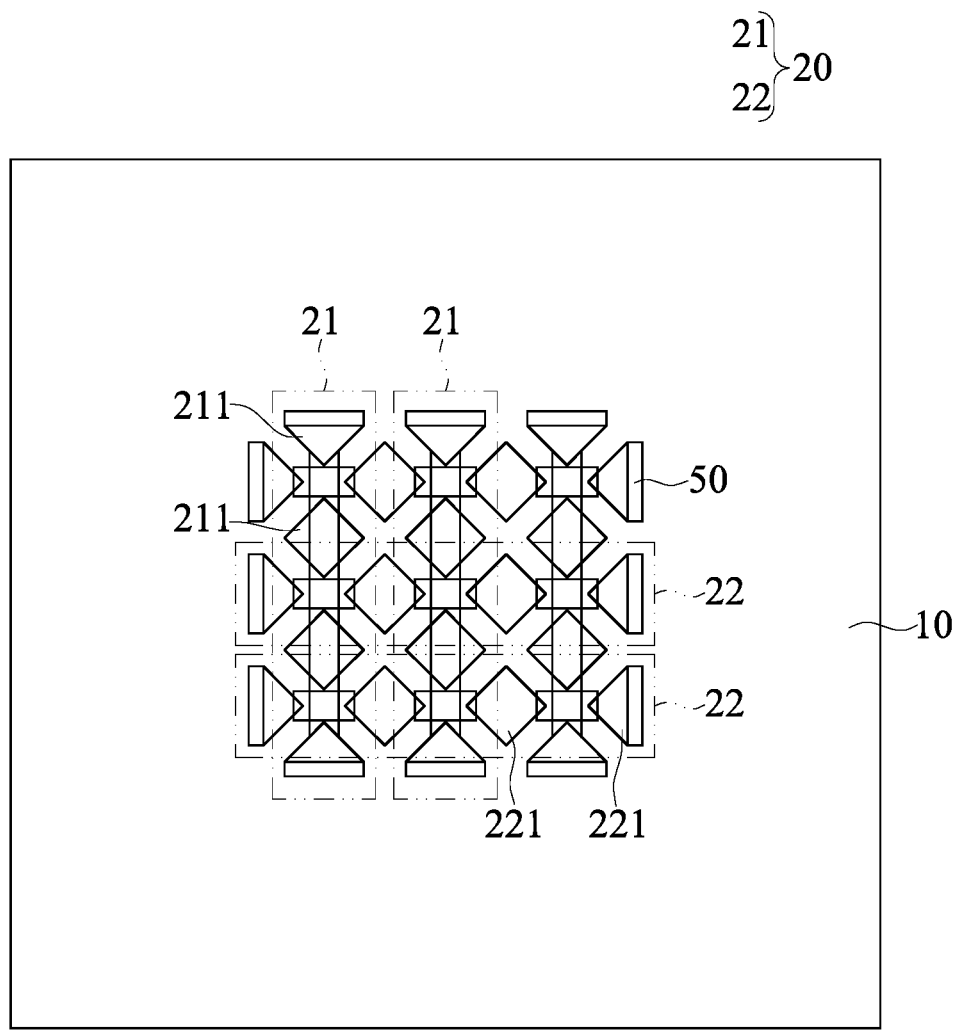
FIG. 3 to FIG. 6 are top views of a substrate in different steps of the method for manufacturing the capacitive touch control panel according to the first embodiment of the present disclosure.

FIG. 3 is a top view of a substrate after the aforesaid Step S10 is executed. In actual practice, the sensing circuit 20 can include multiple columns of Y channels 21 and multiple columns of X channels 22. Each of the Y channels 21 and X channels 22 includes a plurality of sensing electrodes 211, 221 that are connected to one another. The sensing circuit 20 can be manufactured by, for example, a single indium tin oxide (ITO) process or a double ITO process, but should not be limited thereto.

In other embodiments of the present disclosure, the sensing circuit 20 can only include multiple columns of X channels 22. Other than that, the sensing circuit 20 can only include multiple columns of Y channels 21. Moreover, the shape of each of the sensing electrodes 211, 221 can be customized according to practical requirements, and should not be limited to those shown in figures.

Figure 4:
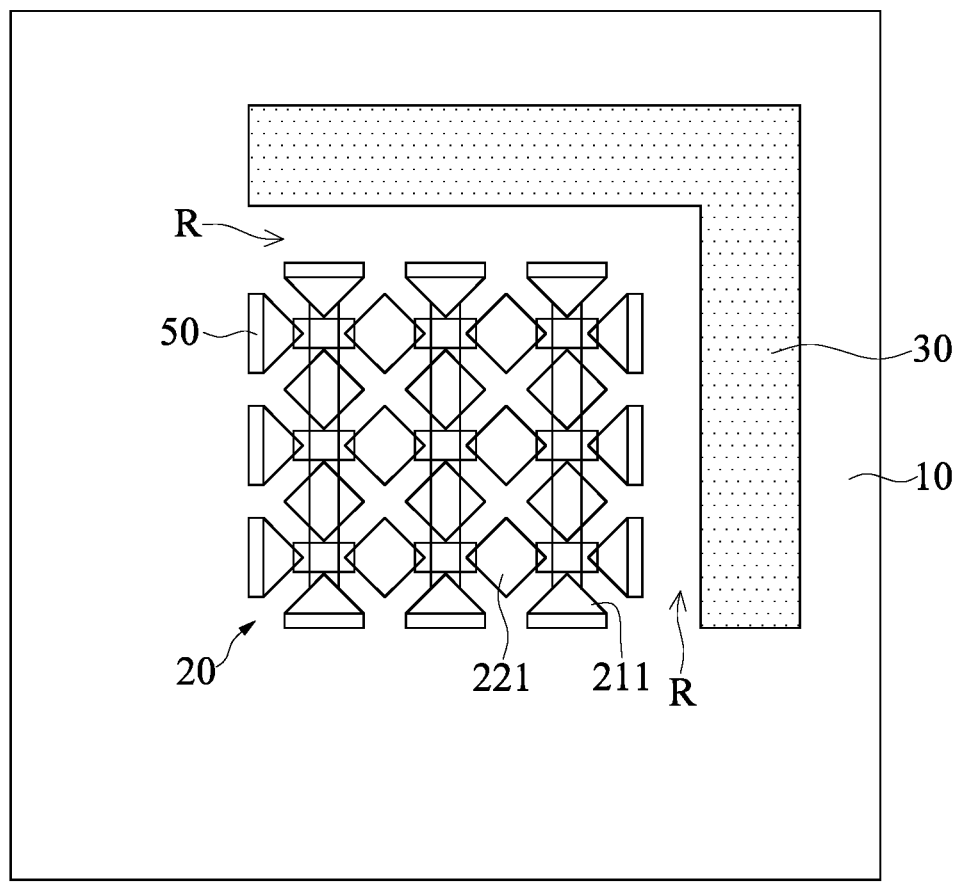

FIG. 4 is a top view of the substrate 10 after the aforesaid Step S11 is executed. In this embodiment, the communicating structure 30 is in an L-shaped form, but should not be limited thereto. The communicating structure 30 can also be in a U-shaped form or in a ring shaped form. Furthermore, the communicating structure 30 in this embodiment is substantially formed by two rectangles. However, the shape the communicating structure 30 can be customized according to practical requirements, and should not be limited to those shown in figures. For example, the communicating structure 30 can be shaped of an arc as long as the communicating structure 30 is disposed to be near at least two adjacent side walls of the substrate 10.

In FIG. 4, the communicating structure 30 is formed on a top-right position of the substrate 10, but the position thereof is not limited thereto. However, the communicating structure 30 can also be formed at other positions of the substrate 10, and should not be limited thereto. For example, the communicating structure 30 can be formed on a bottom-right position, a top-left position or a bottom-left position. In actual practice, the communicating structure 30 can be formed on the substrate 10 by a printing or etching process. The material of the communicating structure 30 can be copper, silver or other conductive materials, but not limited thereto.

Figure 5:
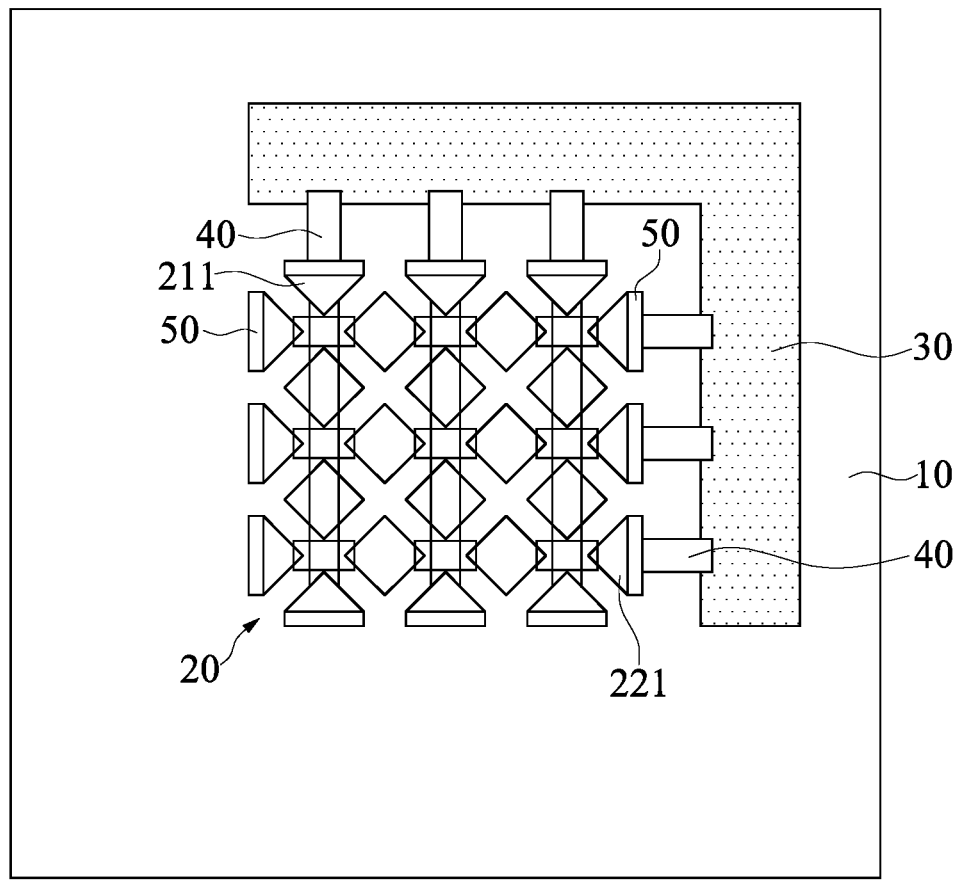

FIG. 5 is a top view of the substrate 10 after the aforesaid Step S12 is executed. In actual practice, the plurality of bridging structures 40 can be formed by silver glue printing. The plurality of bridging structures 40 are used to connect the communicating structure 30 and the plurality of the sensing electrodes 211, 221 near the communicating structure 30. Therefore, the amount of the bridging structures 40 corresponds to that of the sensing electrodes 211, 221 near the communicating structure 30.

Figure 6:
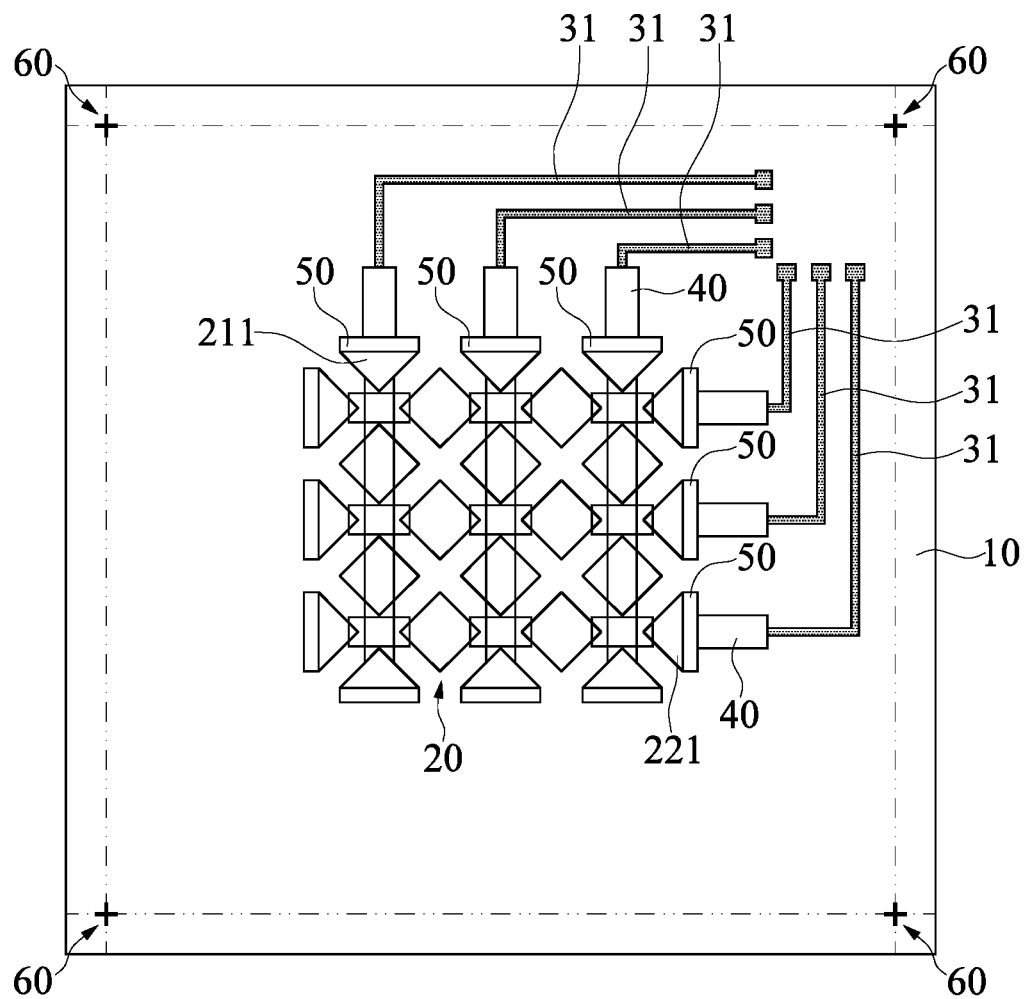

Referring to FIG. 4 to FIG. 6, when manufacturing the touch control panel by the method of manufacturing the capacitive touch control panel of the present disclosure, the manufacturer only needs to change the position where the communicating structure 30 is formed so as to correspondingly change the position of the output cables 31. In this embodiment, since the step S11 is independent from the step S10, there is no need to change the step S10 if the position of the communicating structure 30 is changed. In other words, there is no need to correspondingly change the position of the mask that is required in the step S10 if the position of the communicating structure 30 is changed. On the contrary, the conventional method of manufacturing the capacitive touch control panel needs to change the position of the mask if the position of the output cables 31 is changed, which increases manufacturing costs. Therefore, the method of manufacturing the capacitive touch control panel according to the present disclosure can lower the manufacturing cost compared with the conventional method of manufacturing the capacitive touch control panel.

Moreover, as shown in FIG. 4, in the embodiment that the substrate 10 is rectangular, since the substrate 10 and the communicating structure 30 are non-directional in step S10 and step S11, there is no need to change the step S10 and the step S11 no matter where the ultimate position of the output cable 31 will be in the substrate 10. In this embodiment, the manufacturer of the touch control panel only needs to change the portion of the communicating structure 30 that is to be removed in step S13 according to a request of the client for disposing the output cable 31.

In actual practice, the method of executing the step S13 typically applies the laser cutting by an apparatus to remove a specific portion of the communicating structure 30 according to a predetermined pattern. Thus, the manufacturer can simply change the predetermined pattern in response to the position of the output cable 31 required by the client.

As shown in FIG. 6, after the step of forming the output cables (S13), the method for manufacturing the capacitive touch control panel can further includes a substrate cutting step. The method for manufacturing the capacitive touch control panel can further includes a mark making step before the substrate cutting step. The mark making step includes making a plurality of marks 60 on the substrate 10. That is, a cutting tool can cut the substrate 10 along an imaginary line shown in figures. In actual implementation, the mark making step can be executed after the step S13. The position where the plurality of marks 60 are formed can be decided after the position of the output cable 31 is confirmed in accordance with the image of the substrate 10 that is captured by an image capturing unit. Therefore, it can be assured that the output cable 31 will not be cut in the substrate cutting step.

Figure 7:
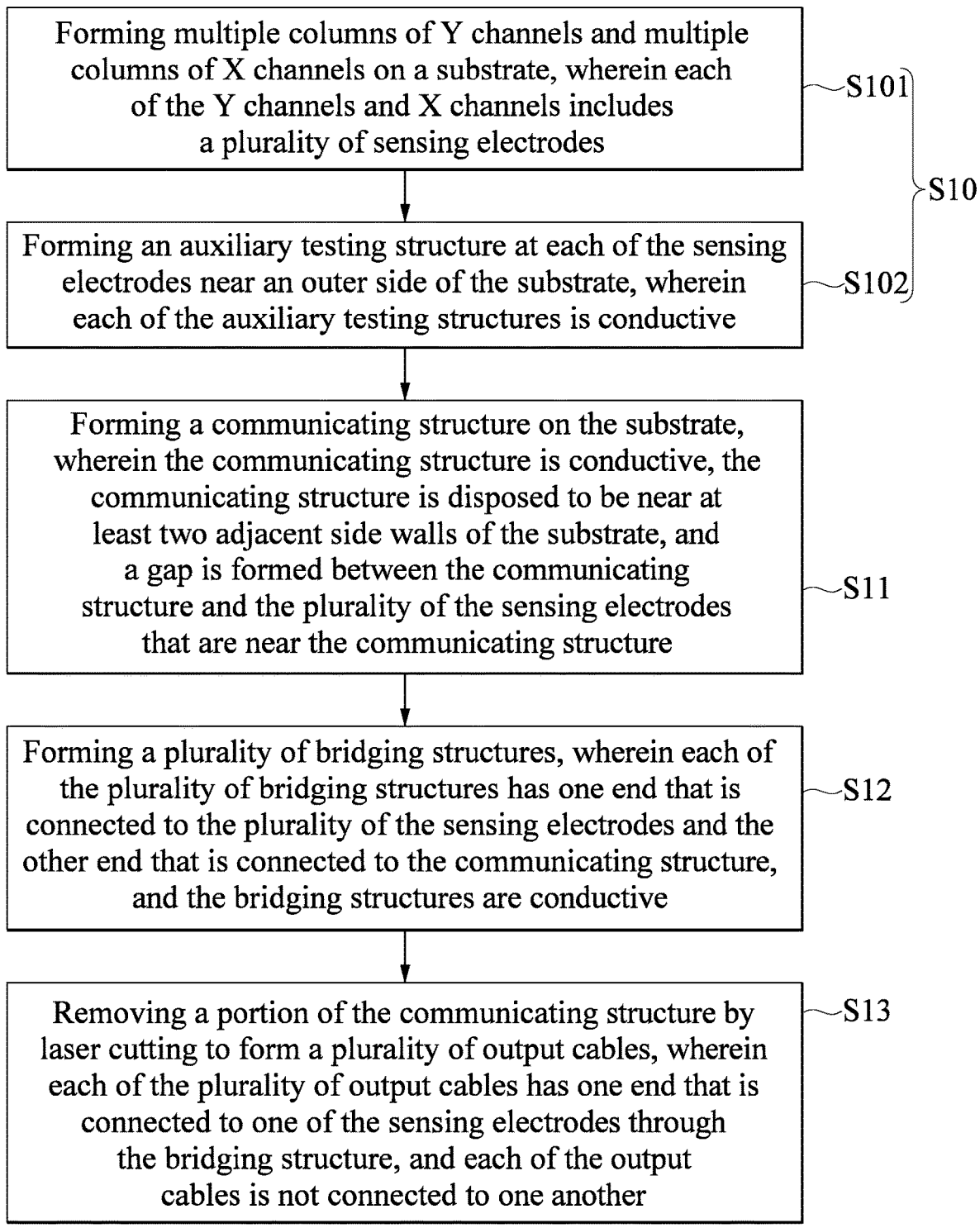
FIG. 7 is a flow chart of the method for manufacturing the capacitive touch control panel according to a second embodiment of the present disclosure.
Figure 8:
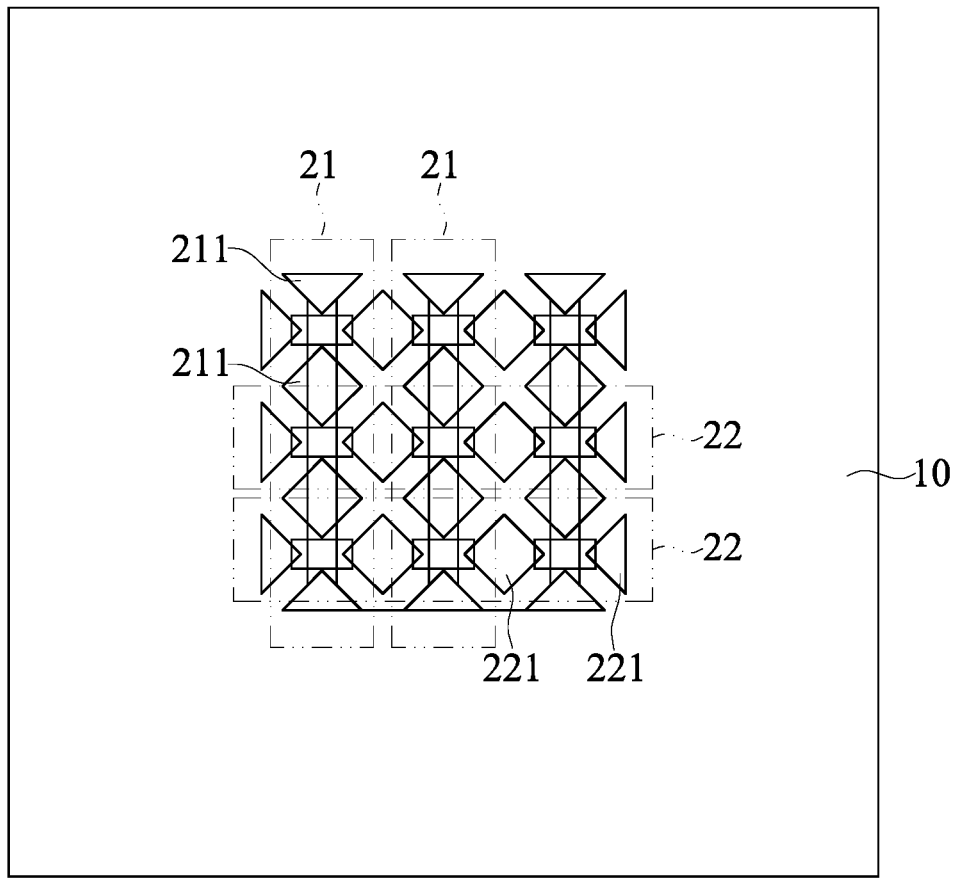
FIG. 8 is a top view of a substrate in one of the steps of the method for manufacturing the capacitive touch control panel according to the second embodiment of the present disclosure.

Further referring to FIG. 7 and FIG. 8, FIG. 7 is a flow chart of the method for manufacturing the capacitive touch control panel according to a second embodiment of the present disclosure. FIG. 8 is a top view of a substrate in one of the steps of the method for manufacturing the capacitive touch control panel according to the second embodiment of the present disclosure. As shown in FIG. 7, the major difference between the present embodiment and the aforesaid embodiment resides in that the step S10 can include the following steps.

Step S101: forming multiple columns of Y channels 21 and multiple columns of X channels 22 on a substrate. Each of the Y channels 21 and X channels 22 includes a plurality of sensing electrodes 211, 221 (as shown in FIG. 8).

Step S102: forming an auxiliary testing structure 50 at each of the sensing electrodes 211, 221 near an outer side of the substrate 10. Each of the auxiliary testing structures 50 is conductive (as shown in FIG. 3).

In practice, in the step S102, the plurality of auxiliary testing structures 50 can be formed on the substrate 10 by printing, but is not limited thereto.

As shown in FIG. 5, the step S12 is to connect one end of the bridge structures 40 to the plurality of the sensing electrodes 211, 221, and to connect the other one end of the bridge structures 40 to the communicating structure 30. By virtue of the auxiliary testing structure 50, the connecting force between each of the sensing electrodes 211, 221 and the bridge structures 40 will be strengthened.

As shown in FIG. 3, in practice, each of the auxiliary testing structures 50 can be connected to an external detecting device. The external detecting device detects conductivity among the plurality of sensing electrodes 211, 221 disposed in the same column via each of the auxiliary testing structures 50. Therefore, the touch control panel having poor conductivity can be excluded in advance such that the subsequent costs associated with the touch control panel can be saved.

It is illustrated in this embodiment that the plurality of the auxiliary testing structures 50 are formed in the step S10, however, the plurality of the auxiliary testing structures 50 are not limited to be formed in the step S10. In other embodiments of the present disclosure, the plurality of the auxiliary testing structures 50 can be formed in other steps. For example, in the abovementioned step S11, the plurality of the auxiliary testing structures 50 can be formed, together with, prior to, or later than forming the communicating structure 30, on the substrate 10.

Figure 10:
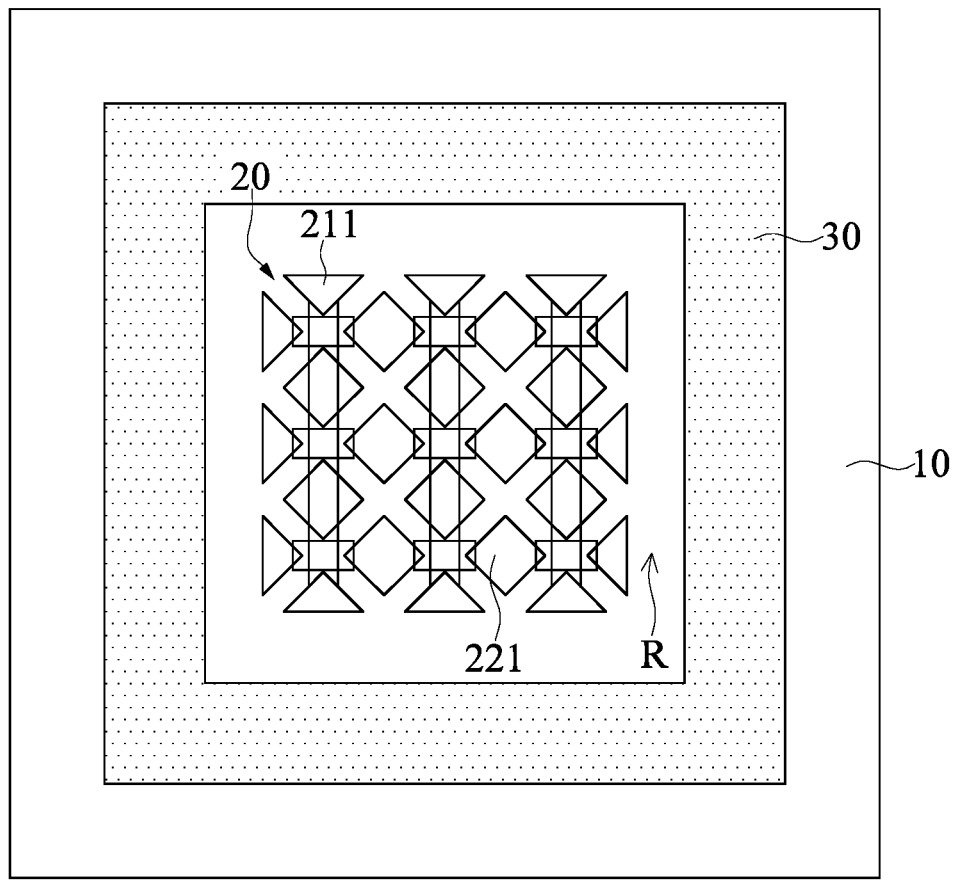
FIG. 10 is a top view of a substrate in one of the steps of the method for manufacturing the capacitive touch control panel according to the third embodiment of the present disclosure.
Figure 11:
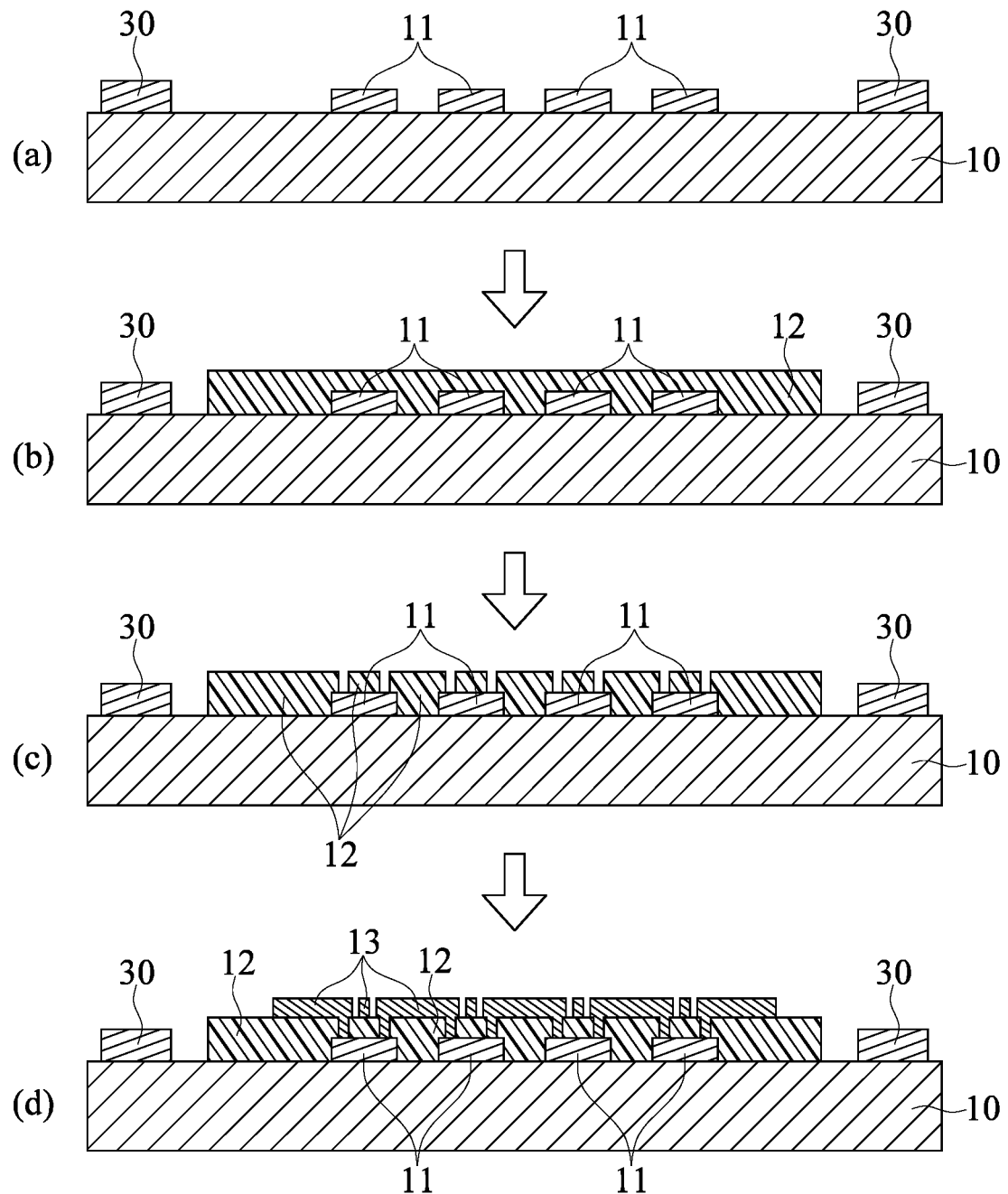
FIG. 11 is a side exploded view of a substrate in one of the steps of the method for manufacturing the capacitive touch control panel according to the third embodiment of the present disclosure.
Figure 12:
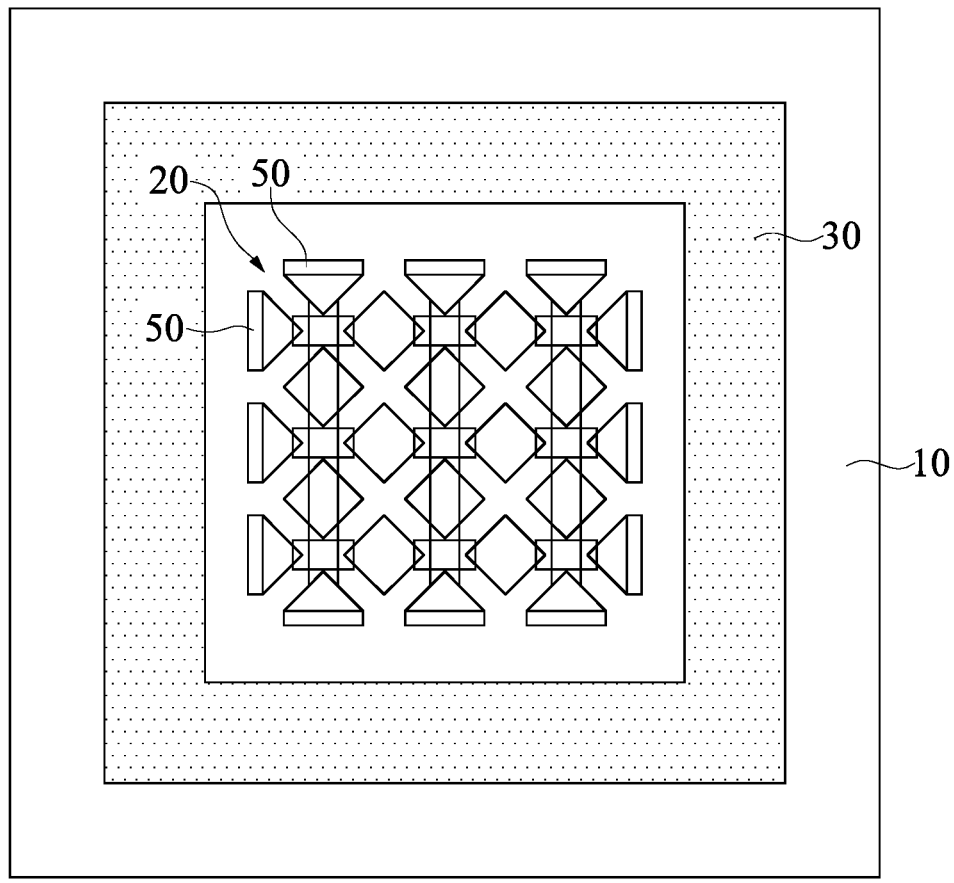
FIG. 12 to FIG. 14 are top views of a substrate in different steps of the method for manufacturing the capacitive touch control panel according to the third embodiment of the present disclosure.
Figure 13:
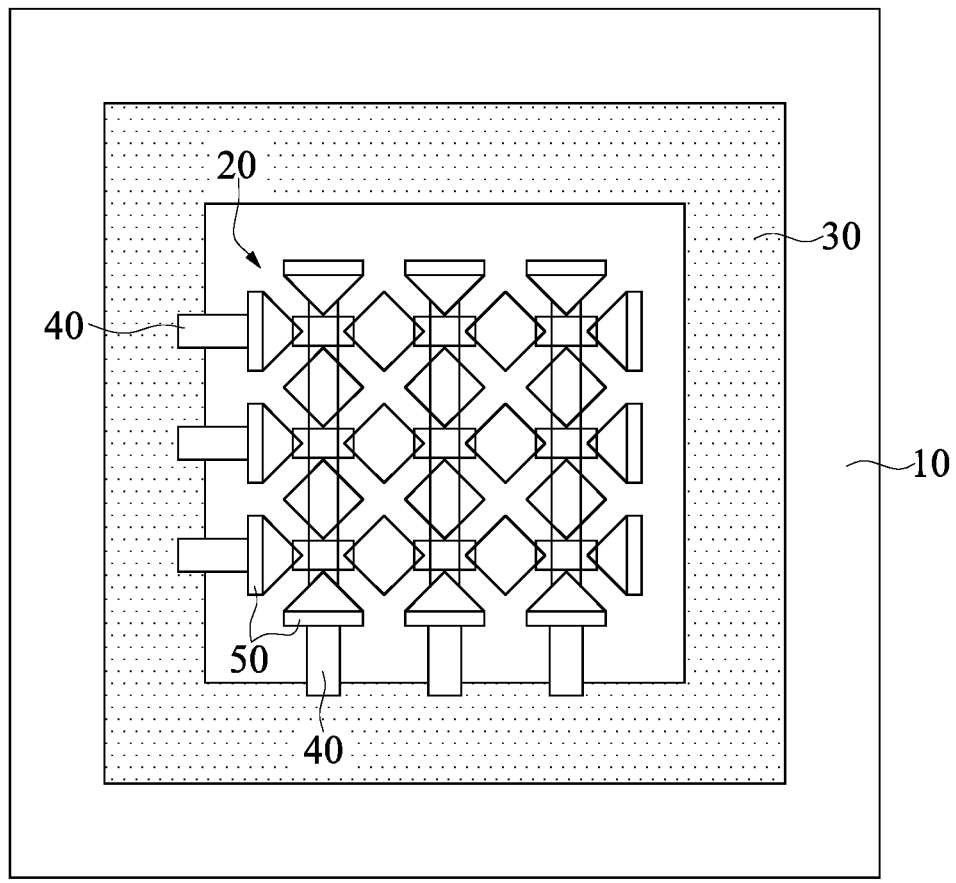
Figure 14:
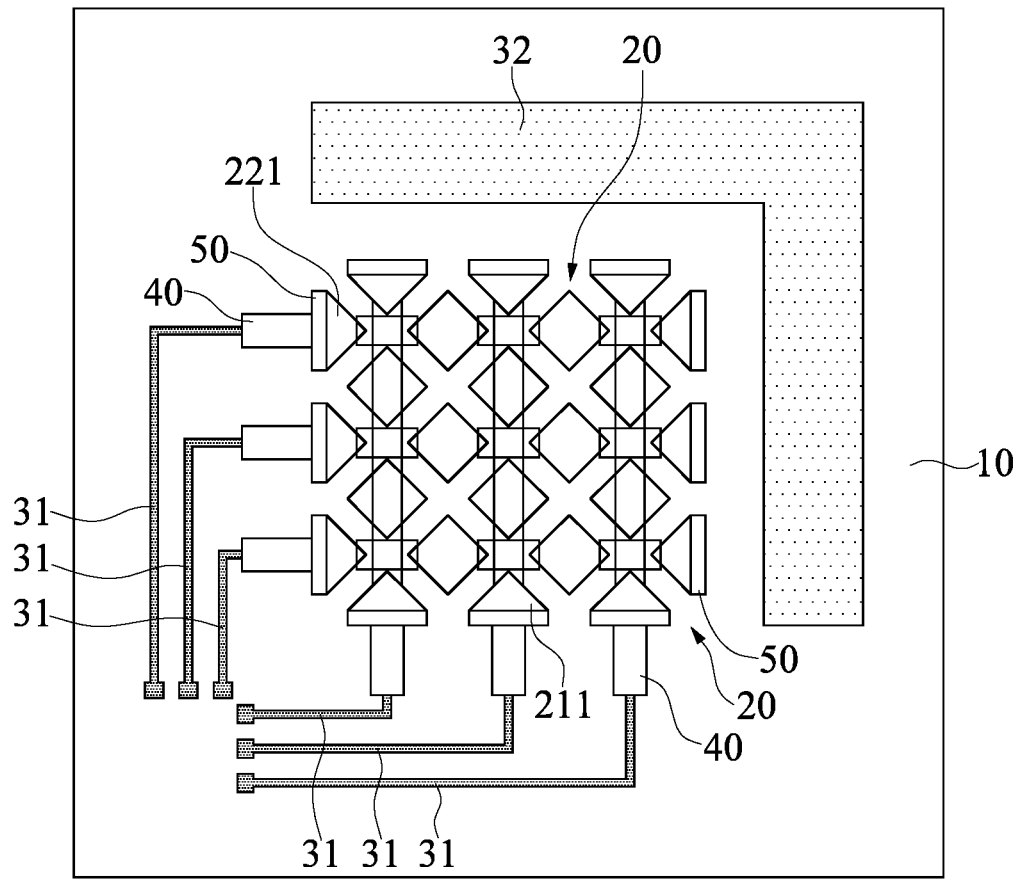

Further referring to FIG. 9 to FIG. 14, FIG. 9 is a flow chart of the method for manufacturing the capacitive touch control panel according to a third embodiment of the present disclosure. FIG. 10 is a top view of a substrate in one of the steps of this embodiment. FIG. 11 is a side exploded view of a substrate in one of the steps of this embodiment. FIG. 12 to FIG. 14 are top views of a substrate in different steps of this embodiment.

Referring to FIG. 9, a method for manufacturing capacitive touch control panel of this embodiment includes the following steps.

Step S20: forming a sensing circuit 20 and a communicating structure 30 on a substrate 10. The sensing circuit 20 includes a plurality of sensing electrodes 211, 221 that are disposed in a multi-column arrangement. The communicating structure 30 is in a ring shaped form. The sensing circuit 20 is correspondingly disposed within an area that is surrounded by the communicating structure 30. A gap R is formed between the communicating structure 30 and the plurality of the sensing electrodes 211, 221 that are near the communicating structure 30. The communicating structure 30 is conductive.

Step S21: forming a plurality of bridging structures 40. Each of the plurality of bridging structures 40 has one end that is connected to the plurality of the sensing electrodes 211, 221 and the other end that is connected to the communicating structure 30. The bridging structures 40 are conductive.

Step S22: removing a portion of the communicating structure 30 by laser cutting to form a plurality of output cables 31. Each of the plurality of output cables 31 has one end that is connected to one of the sensing electrodes 211, 221 through the bridging structure 40. Each of the output cables 31 is not connected to one another.

The output cable 31 is connected to a control device. Each of the sensing electrodes 211, 221 is operable to generate corresponding signals that are transmitted to the control device via the output cable 31.

As shown in FIG. 11, the step S20 is to simultaneously form the sensing circuit 20 and the communicating structure 30 on the substrate 10 by the single ITO process. Specifically, the process includes the following steps.

Step 1: forming a metal cable structure 11 and the communicating structure 30 on the substrate 10. The metal cable structure 11 is regarded as the conductive structure of each column of the X and Y channels 21, 22 (as shown in FIG. 11a). In actual practice, the metal cable structure 11 and the communicating structure 30 can be formed by one mask at the same time.

Step 2: forming an isolating layer 12 on the substrate 10 and the metal cable structure 11. In this step, the isolating layer 12 may be not formed on the communicating structure 30.

Step 3: removing a portion of the isolating layer 12 to expose a portion of the metal cable structure 11 (as shown in FIG. 11c).

Step 4: forming an ITO pattern structure 13 on a metal cable structure 11 and the isolating layer 12 so as to form a plurality of the sensing electrodes 211, 221. Portions of the sensing electrodes 211, 221 are connected to the metal cable structure 11 so as to form the multiple columns of X channels, and the other portions of the sensing electrodes 211, 221 form the multiple columns of Y channels (as shown in FIG. 11d).

In the abovementioned step 1, since the communicating structure 30 is formed in a ring shape, the manufacturer does not need to change the mask of the communicating structure 30 and the metal cable structure 11 no matter which side of the substrate 10 the output cable 31 is required by the client to be placed at. As a result, the costs for changing the mask can be saved.

It should be noted that, in other embodiment of the present disclosure, the step S20 can also apply a double ITO process to simultaneously form the sensing circuit and the communicating structure 30 on the substrate 10.

As shown in FIG. 12, the method for manufacturing the capacitive touch control panel can further include the step of forming the auxiliary testing structure 50 (S102) before the step of forming the plurality of bridging structures 40 (S21). As shown in FIG. 13, in step S21, the position of forming the plurality of bridging structures 40 correspond to the ultimate positions of the output cables 31. In other words, the plurality of bridging structures 40 can also be formed on only a portion of the sensing electrodes 211, 221.

As shown in FIG. 14, in the step S22, at least one shielding structure 32 is further formed when the portion of the communicating structure 30 is removed by the laser cutting. The shielding structure 32 is not connected to any one of the output cables 31 or any one of the sensing electrodes 211, 221. The shielding structure 32 is to strengthen capability of the touch control panel for reducing an external electromagnetic interference. The shape and the position of the shielding structure 32 can be customized according to practical requirement. Preferably, the shielding structure 32 can be disposed to surround the plurality of the sensing electrodes 211, 221 that is near the shielding structure 32. In practice, the shielding structure 32 of the touch control panel shown in FIG. 14 can be partly removed by the cutting process in the subsequent substrate cutting steps.

Figure 16:
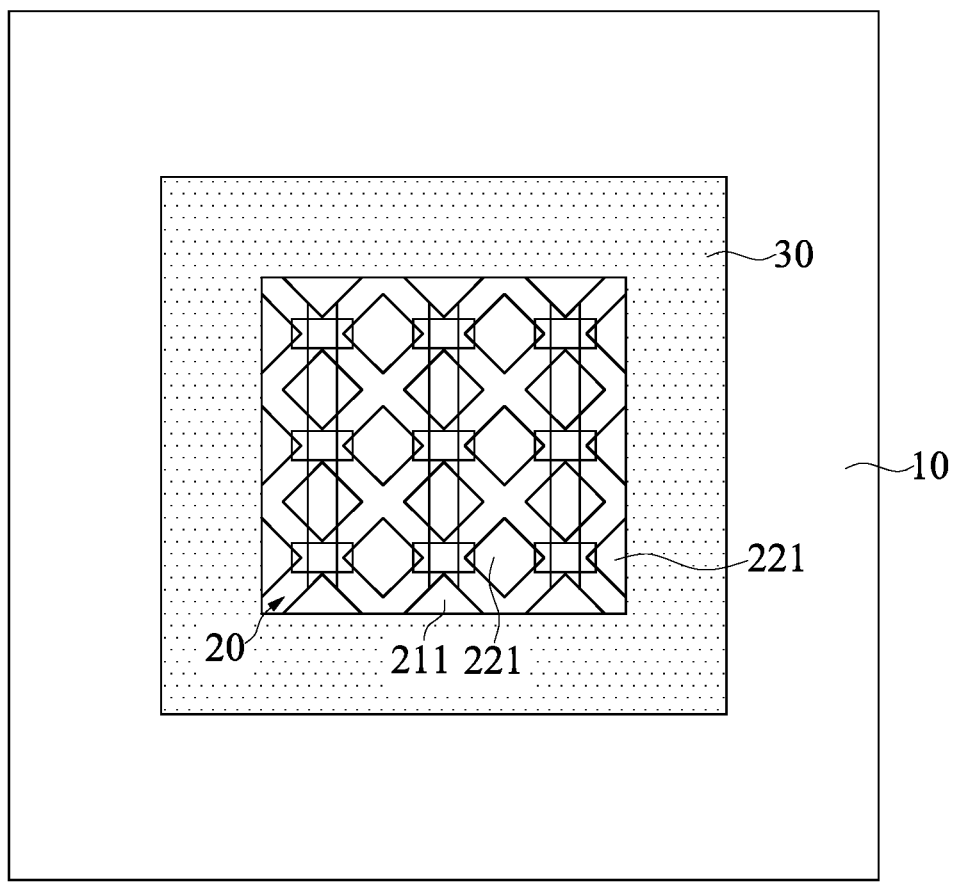
FIG. 16 to FIG. 17 are top views of a substrate in different steps of the method for manufacturing the capacitive touch control panel according to a fourth embodiment of the present disclosure.
Figure 17:
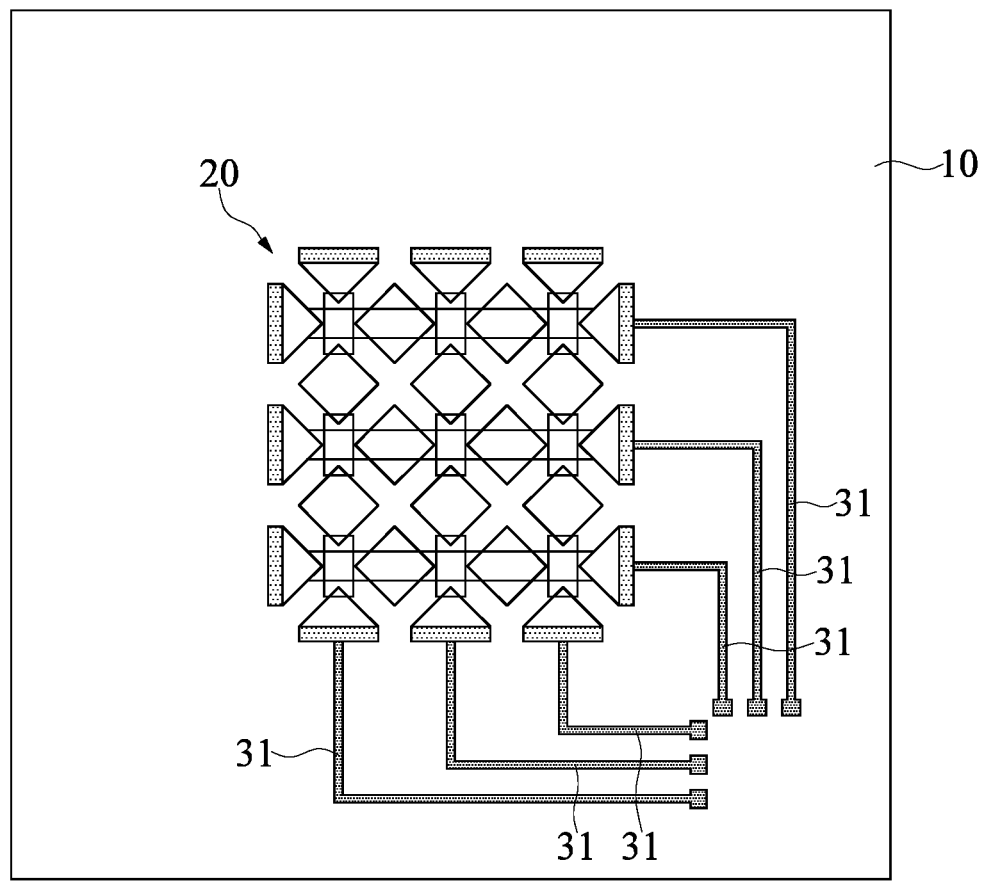

Further referring to FIG. 15 to FIG. 17, FIG. 15 is a flow chart of the method for manufacturing the capacitive touch control panel according to a fourth embodiment of the present disclosure. FIG. 16 and FIG. 17 are top views of a substrate in different steps of this embodiment.

As shown in FIG. 15, the method for manufacturing the capacitive touch control panel according to this embodiment includes the following steps.

Step S30: forming a sensing circuit 20 and a communicating structure 30 on a substrate 10. The sensing circuit 20 includes a plurality of sensing electrodes 211, 221 that are disposed in a multi-column arrangement. The communicating structure 30 is in a ring shaped form. The sensing circuit 20 is correspondingly disposed within an area that is surrounded by the communicating structure 30. The communicating structure 30 is connected to the sensing electrodes 211, 221 near the communicating structure 30. The communicating structure 30 is conductive.

Step S31: removing a portion of the communicating structure 30 by laser cutting to form a plurality of output cables 31. Each of the plurality of output cables 31 has one end that is connected to one of the sensing electrodes 211, 221. Each of the output cables 31 is not connected to one another.

The output cable 31 is connected to a control device. Each of the sensing electrodes 211, 221 is operable to generate corresponding signals that are transmitted to the control device via the output cable 31.

Referring to FIG. 16, a top view of a substrate 10 after the step S30 is shown. In practice, the communicating structure 30 can be formed, together with a portion of the sensing structure 20, on the substrate 10. Or, the communicating structure 30 can also be formed on the substrate 10 after the sensing structure 20 is formed on the substrate 10.

In practice, the method for manufacturing the capacitive touch control panel according to the present disclosure can further includes, after the step S30, the step of forming the bridging structure (step S12) so as to strength the connecting force between each of the sensing electrodes 211, 221 and the communicating structures 30.

Further referring to FIG. 6, FIG. 14 and FIG. 17, the top views of the touch control panel of the present disclosure are shown. The touch control panels shown in those figures are manufactured by the above-mentioned methods.

In conclusion, when the manufacturer applies the method for manufacturing the capacitive touch control panel according to the present disclosure, the manufacturer can simply change the positions where the communicating structure and the laser cutting are formed so as to change the position of output cable according to client requirements. Compared with the conventional method, the method for manufacturing the capacitive touch control panel according to the present disclosure is not required to redesign the mask when the position of the output cable is changed. Therefore, the method for manufacturing the capacitive touch control panel according to the present disclosure requires lower manufacturing cost compared with the conventional method. Moreover, the position to dispose the output cable on the substrate can be flexibly adjusted based on the needs of the clients. On the contrary, the conventional method of manufacturing the capacitive touch control panel needs to change the position of or redesign the mask if the position of the output cables is changed, which increases the manufacturing costs. Since the method for manufacturing the capacitive touch control panel according to the present disclosure does not require redesigning the mask, the capacitive touch control panel can be quickly deployed for mass production.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a capacitive touch control panel, comprising:
    forming a sensing circuit on a substrate, wherein the sensing circuit includes a plurality of sensing electrodes that are disposed in a multi-column arrangement;
    forming a communicating structure on the substrate, wherein the communicating structure is conductive, the communicating structure is disposed to be near at least two adjacent side walls of the substrate, and a gap is formed between the communicating structure and the plurality of the sensing electrodes that are near the communicating structure; wherein the communicating structure is in one of an L-shaped form, a U-shaped form and a ring shaped form;
    forming a plurality of bridging structures, wherein each of the plurality of bridging structures has one end that is connected to the plurality of the sensing electrodes and the other end that is connected to the communicating structure, the bridging structures are conductive, and the bridging structures are formed by silver glue printing; and
    after forming the bridging structures, removing a portion of the communicating structure by laser cutting to form a plurality of output cables, wherein each of the plurality of output cables has one end that is connected to one of the sensing electrodes through the bridging structure, and each of the output cables is not connected to one another,
    wherein the output cable is connected to a control device, and each of the sensing electrodes is operable to generate corresponding signals that are transmitted to the control device via the output cable.

2. The method for manufacturing the capacitive touch control panel according to claim 1, wherein in the step of forming the output cables, at least one shielding structure is further formed when the portion of the communicating structure is removed by the laser cutting, and the shielding structure is not connected to any one of the output cables or any one of the sensing electrodes.

3. The method for manufacturing the capacitive touch control panel according to claim 1, further comprising:
    a substrate cutting step after the step of forming the output cables, wherein the substrate cutting step includes cutting the substrate only or cutting the substrate and the communicating structure simultaneously; and
    a mark making step before the substrate cutting step, wherein the mark making step includes making a plurality of marks on the substrate,
    wherein in the substrate cutting step, the substrate is cut according to the plurality of marks.

4. The method for manufacturing the capacitive touch control panel according to claim 1, further comprising:
    between the step of forming the sensing circuit and the step of forming the plurality of bridging structures, a step of forming an auxiliary testing structure,
    wherein the step of forming the auxiliary testing structure includes forming the auxiliary testing structure at each of the sensing electrodes near an outer side of the substrate, wherein each of the auxiliary testing structures is conductive, wherein in the step of forming the plurality of bridging structures, each of the plurality of bridging structures has one end that is connected to the plurality of the auxiliary testing structures and the other end that is connected to the communicating structure, and wherein each of the auxiliary testing structures is connected to an external detecting device, and the external detecting device detects conductivity among the plurality of sensing electrodes disposed in the same column via each of the auxiliary testing structures.

5. A method for manufacturing capacitive touch control panel, comprising:
    forming a sensing circuit and a communicating structure on a substrate, wherein the sensing circuit includes a plurality of sensing electrodes that are disposed in a multi-column arrangement, wherein the communicating structure is in a ring shaped form, wherein the sensing circuit is correspondingly disposed within an area that is surrounded by the communicating structure, wherein a gap is formed between the communicating structure and the plurality of the sensing electrodes that are near the communicating structure, and wherein the communicating structure is conductive;
    forming a plurality of bridging structures, wherein each of the plurality of bridging structures has one end that is connected to the plurality of the sensing electrodes and the other end that is connected to the communicating structure, the bridging structures are conductive; and
    removing a portion of the communicating structure by laser cutting to form a plurality of output cables, wherein each of the plurality of output cables has one end that is connected to one of the sensing electrodes through the bridging structure, and each of the output cables is not connected to one another, wherein the output cable is connected to a control device, each of the sensing electrodes is operable to generate corresponding signals that are transmitted to the control device via the output cable.

6. The method according to claim 5, wherein in the step of forming the output cables, at least one shielding structure is further formed when the portion of the communicating structure is removed by the laser cutting, and the shielding structure is not connected to any one of the output cables or any one of the sensing electrodes.

7. The method according to claim 5, further comprising:
a substrate cutting step after the step of forming the output cables, wherein the substrate cutting step includes cutting the substrate only or cutting the substrate and the communicating structure simultaneously; and
a mark making step before the substrate cutting step, wherein the mark making step includes making a plurality of marks on the substrate,
wherein in the substrate cutting step, the substrate is cut according to the plurality of marks.

8. The method according to claim 5, further comprising:
a step of forming an auxiliary testing structure before the step of forming the plurality of bridging structures
wherein the step of forming the auxiliary testing structure includes forming the auxiliary testing structure at each of the sensing electrodes near an outer side of the substrate, wherein each of the auxiliary testing structures is conductive, wherein in the step of forming the plurality of bridging structures, each of the plurality of bridging structures has one end that is connected to the plurality of the auxiliary testing structures and the other end that is connected to the communicating structure, and wherein each of the auxiliary testing structures is connected to an external detecting device, and the external detecting device detects conductivity among the plurality of sensing electrodes disposed in the same column via each of the auxiliary testing structures.

9. A method for manufacturing capacitive touch control panel, comprising:
forming a sensing circuit and a communicating structure on a substrate, wherein the sensing circuit includes a plurality of sensing electrodes that are disposed in a multi-column arrangement, wherein the communicating structure is in a ring shaped form, wherein the sensing circuit is correspondingly disposed within an area that is surrounded by the communicating structure, wherein a gap is formed between the communicating structure and the plurality of the sensing electrodes that are near the communicating structure, and wherein the communicating structure is conductive;
removing a portion of the communicating structure by laser cutting to form a plurality of output cables, wherein each of the plurality of output cables has one end that is connected to one of the sensing electrodes, and each of the output cables is not connected to one another,
wherein the output cable is connected to a control device, and each of the sensing electrodes is operable to generate corresponding signals that are transmitted to the control device via the output cable.

10. The method according to claim 9, wherein in the step of forming the output cables, at least one shielding structure is further formed when the portion of the communicating structure is removed by the laser cutting, the shielding structure is not connected to any one of the output cables or any one of the sensing electrodes.

11. A capacitive touch control panel manufactured by the method of any one of claims 2, 6, and 10, comprising the substrate, the sensing circuit, the output cables, and the at least one shielding structure.

* * * * *